United States Patent Office 3,467,099
Patented Sept. 16, 1969

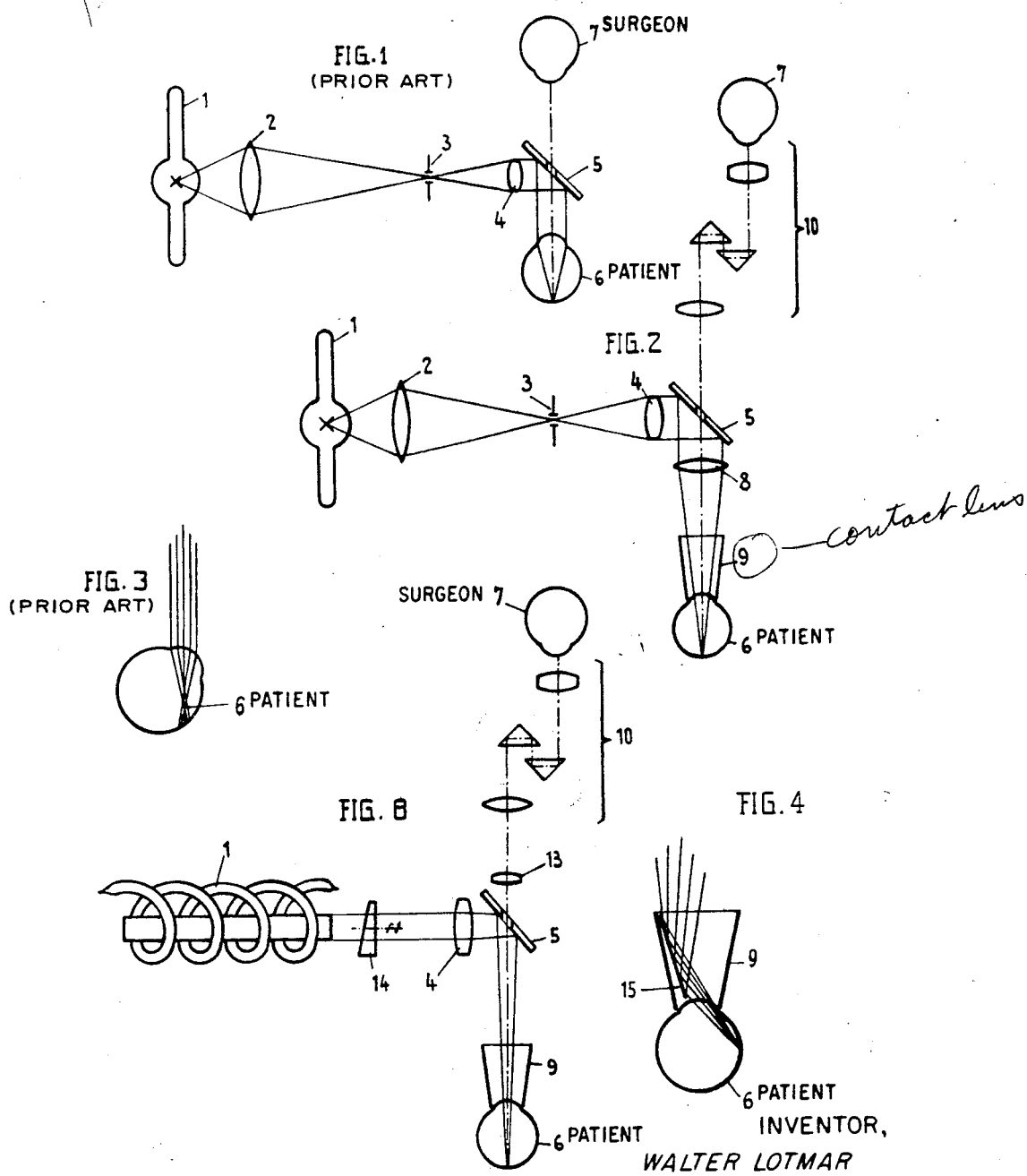

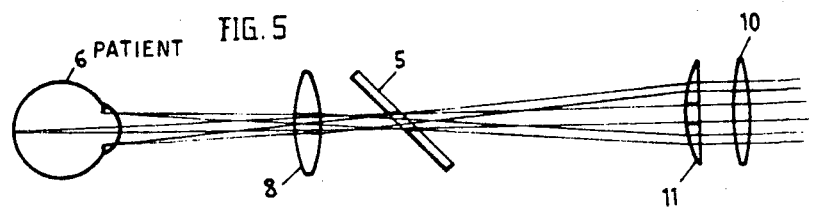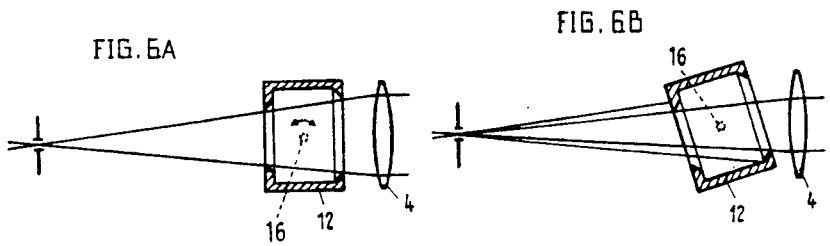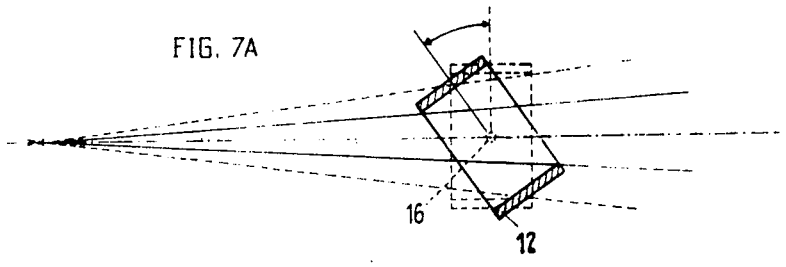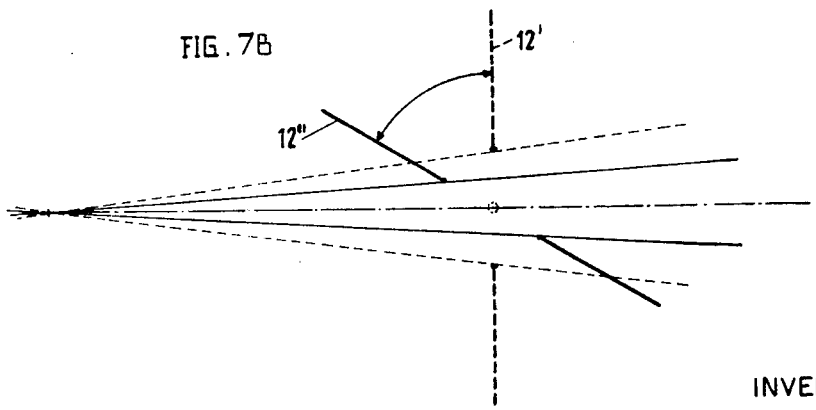

3,467,099
METHOD AND APPARATUS FOR THE COAGULATION OF SMALL AREAS OF THE RETINA OF THE EYE
Walter Lotmar, Spiegel, near Bern, Switzerland, assignor to Research Corporation, New York, N.Y., a non-profit corporation of New York
Filed Mar. 30, 1967, Ser. No. 627,177
Claims priority, application Switzerland, Apr. 2, 1966, 4,852/66
Int. Cl. A61b *17/36;* A61n *3/00*
U.S. Cl. 128—303.1    12 Claims

ABSTRACT OF THE DISCLOSURE

Surgical method and apparatus, for coagulation of small areas of the retina of the eye, having a source of light adapted to be directed onto the retina through a light bundle and a contact glass having a plano front surface which is placed upon the eye to be treated.

---

The eye disease known as retinal detachment can be prophylactically treated at its early stages by reattaching the retina to the underlying choroidea in using local heat treatment. In order to reduce to a minimum the functional loss of the eye thus caused it is advantageous to produce a series of small "biological welds" around the retinal breaks. This may be achieved in known manner by forming on the retina, through the optical media of the eye, an image of a very bright light source of small angular extent situated virtually at infinity, thus producing a degeneration of the tissue accompanied by welding it to the choroidea (photocoagulation). The area to be coagulated is usually marked by a pilot light under ophthalmoscopic observation.

While coagulations of the retina by this method at its central parts, i.e. near the optical axis of the eye, offer no special difficulties, this is not so for peripheral parts. As a consequence of the well-known aberrations of the optical system of the eye (spherical, astigmatism, coma, and field curvature) the image of the light source is more or less degraded for peripheral parts. This in general results in a larger light spot of lower brightness. In order to attain the coagulation threshold the brightness of the source or the time of treatment have to be increased, which usually is not desirable.

The aberrations of the optical media of the eye have however not only a disadvantageous influence on the result of the coagulation but also make the preceding observation with the pilot light more difficult. These aberrations are especially pronounced in known photocoagulation procedures because the pupil of the eye to be treated is artificially enlarged both for getting a maximum of light energy on the retina and avoiding possible damage to the iris. It is however well known that the aberrations of an optical system rapidly increase as a function of its free aperture.

One object of the present invention is to provide a procedure and apparatus for the photocoagulation of small areas of the retina avoiding the above-mentioned disadvantages by the use of a contact glass placed on the eye. With this combination coagulations on peripheral parts of the retina may be performed with the same ease and perfection as those on central parts.

Another object of the invention is to provide means for observing the iris at the same time as the retina, this having been difficult with existing coagulation systems. Observation of the iris before and during coagulation is of importance in order to avoid possible damage by the light rays entering the eye.

Another object of the invention is to provide means for producing an elongated cross section of the cone of light entering the pupil. This allows the aperture of the pupil to be optimally made use of when the bundle of rays is entering obliquely.

The novel features which are considered as characteristic for the invention are set forth in particular in the appended claims. The invention itself, however, both as to its method of operation and its construction, together with additional objects and advantages thereof, will be best understood from the following description of specific embodiments when read in connection with the accompanying drawings.

Referring to the drawings:
FIG. 1 represents a known optical system for producing coagulations of the retina;
FIG. 2 represents one embodiment of an optical system for producing coagulations of the retina according to the invention;
FIG. 3 is a diagrammatic representation of the degradation of the coagulating light bundle in the optical system of FIG. 1;
FIG. 4 is a diagrammatic representation of the avoidance of such degradation by the optical system of the invention;
FIG. 5 is a diagrammatic partial representation of an optical system of the invention showing optical elements for improving the image of the iris to an observer;
FIGS. 6A, 6B, 7A and 7B are diagrammatic representations showing the use of a beam modifying element in the optical system of the invention; and
FIG. 8 is a representation of a further embodiment of the principles of the invention.

In the figures 1 designates a bright light source, 2 a condenser, 3 a diaphragm of variable size, 4 a collecting lens group whose anterior focus coincides with diaphragm 3, 5 a mirror with a central hold in its reflecting layer, 6 the eye to be treated, and 7 the eye of the operator. In FIG. 2 furthermore, 8 designates a collecting lens group forming an image of diaphragm 3 on the retina of eye 6 from the parallel bundle of light rays reflected by mirror 5 into it, 9 designates a contact glass with a plano front surface placed on the cornea of eye 6, and 10 designates a telescope with an erecting system.

FIG. 3 shows how in the known method of photocoagulation the image of the light source is deteriorated as a consequence of the aberrations of the optical system of the eye when the bundle of light rays enters the eye obliquely.

FIG. 4 shows that such deterioration of the image of the light source can be avoided by the use of the optical apparatus according to the invention in combination with a contact glass with a plano front surface. The contact glass 9 as shown in FIG. 4 contains an oblique inner plane mirror 15 which reflects the bundle of rays towards the peripheral parts of the eye 6. Contact glasses of such construction ar known. By placing a contact glass on the eye the optical power of the cornea, and at the same time its aberrations, are practically eliminated. As the cornea contributes for the major part of the total optical power of the eye, the image-forming quality of the system is much improved so that the image of the light source on the retina is only slightly disturbed. A further advantage of the optical system according to the invention is the possibility to focus the light source exactly on the retina by varying the distance between the optics and the contact glass. In this way the disadvantageous effect of the field curvature present in the known method of coagulation can be overcome.

Addition of the telescope 10 to the optical system according to the invention is desirable for observing the retina at a sufficient magnification. As the focal length of lens 8 which acts as a "viewing glass," has indeed to be much longer than that of the optical system of the eye corresponding to its function in the known method (FIG. 1), the magnification when observing with the naked eye would be reduced by the ratio of these focal lengths. A relatively long focal length of lens 8 is necessary because of the thickness of the contact glass 9 and some distance reserve which must be available between lens 8 and contact glass 9. Known contact glasses incorporating an oblique plane mirror 15 as shown in FIG. 4 may e.g. have a thickness of 25 mm.

The use of a contact glass with an incorporated mirror has the further advantage that all peripheral parts of the retina may be reached by simply tilting and rotating the glass whereas with the known method the orientation of the optical system or that of the eye had to be changed for this purpose.

A plano front surface of the contact glass is preferred because it will introduce a minimum of aberrations.

FIG. 5 shows how it is possible, according to the invention, to provide a sharp image of the iris of eye 6 to the observer, along with the image of the retina, by placing an annular lens 11 on telescope 10. In this figure the contact glass has been omitted as it is of no importance for this problem. The hole in the mirror 5, acting as a stop, cuts out a narrow parallel pencil of rays from the bundle issuing from the small illuminated spot on the retina. This pencil then goes through the central hole of the annular lens 11 and is focused in the image plane of the telescope 10. On the other hand rays issuing from the iris of eye 6 and going also through the hole in mirror 5 can be prevented from going through the center of the annular lens 11 by making the distance of this lens from the mirror long enough. A simple geometric calculation shows that this distance must be greater than $2fd/p$ for a complete separation of the bundles of rays to take place on the annular lens, where $f$ is the focal length of the collecting lens 8 of FIG. 5, $d$ the diameter of the hole of mirror 5 and $p$ the diameter of the pupil of eye 6. Under this condition the bundles of rays issuing from the iris of eye 6 therefore go through the active part of the annular lens 11 whose power can easily be chosen so as to form a virtual image of the iris at infinity which will then be focused at the image plane of the telescope 10. The observer looking through the eyepiece of this telescope will therefore see the fundus and the iris of the eye 6 sharply focused at the same time. With the optical system according to FIGURE 1 such a device is hardly possible because the eye 7 of the observer must be situated as near as possible to mirror 5 in order to avoid vignetting, and a great distance would therefore impair observation significantly.

FIGS. 6 and 6B show how it is possible to give to the cross-section of the light bundle entering the eye a near-elliptic shape by providing a short rotatable tube 12 near lens 4. Tube 12 can be rotated about an axis 16 at right angle to its own axis, and also about the optical axis of lens 4. The cross-section of the bundle after passing the tube will in general be delimited by an elliptical lune of variable width whose azimuth can be oriented at will. The bundle will retain the form of its cross section at the pupil of eye 6, and it will therefore be possible to adapt the width and azimuth of the lune to the apparent shape of the pupil seen in perspective so as to make an optimal use of its surface. A tubular diaphragm as described has the advantage that its outer diameter can be made substantially smaller than that of a normal diaphragm of little thickness without part of the light bundle to be stopped taking its way beyond the border of the diaphragm when the latter is strongly inclined. A comparison of these two forms of a diaphragm is shown in FIGS. 7A and 7B, wherein 12' and 12" in FIG. 7B indicate the upright and inclined positions respectively of a thin diaphragm. A small outer diameter of a diaphragm incorporated in an optical apparatus will in general be desirable.

If light sources of a high degree of homocentricity, as e.g. lasers, are used, it will become possible to focus the light rays on the retina by only one lens group situated between the source and the mirror, without the source image on the retina assuming too large a diameter. This modification of the invention is shown in FIG. 8. It has the advantage of avoiding any stray light from optical parts lying between the mirror and the eye to be treated, as for example lens 8 in FIG. 2. On the other hand the optical power of this lens as a collimating lens for observation can be provided by a collecting lens 13 situated behind the mirror which therefore gives no rise to reflected straylight. The numbers 1 to 10 in FIG. 8 refer to the same components as in FIGS. 1 and 2, the light source being represented by a laser.

It is known that the apparatus according to FIG. 1 can also be used with a laser as a light source. If however in this case the rays are well focused on the retina the coagulated area tends to be too small to provide a reliable bond between the retina and the choroidea. As a consequence means have been introduced to increase the diameter of the focus spot on the retina, consisting for example of diffusing screens or additional lenses. Such means are however effective only at the expense of the intensity in the spot. When a laser of continuous operation, or of a relatively high rate of pulse sequence, is used with the apparatus according to FIG. 8, a similar effect of producing a coagulated area of larger diameter than that of the focus spot may also be achieved, according to the invention, by slowly rotating the bundle of rays at a small angle about the optical axis of lens 4, thereby imposing a circular motion of small diameter to the focus spot on the retina. This can be achieved for example by providing a wedge of small angle somewhere in the path of light, which rotates about the optical axis (14 in FIG. 8). This will produce an annular zone of coagulation whose binding power is much better than that of a single spot of small diameter.

For a practical execution of the optical apparatus according to this invention it is of an advantage to place all parts from the light source to the observation telescope, with exception of the contact glass, on a common base plate. By this device it will be possible to choose freely the direction and focusing of the light bundle striking the retina without impairing the adjustment of the different optical parts relatively to each other.

As a pilot light for observation and marking before coagulation the same source may be used if provision for sufficient damping is made, e.g. by a neutral filter. For coagulation the damping device is then removed for a short time. For a laser with single pulse operation this solution is however not possible, and a separate pilot light has to be used in this case.

What is claimed is:

1. Apparatus for the photocoagulation of small areas of the retina of the eye comprising a light source engendering a nearly homocentric bundle of rays, a lens system focusing said light bundle on the retina to be treated, a mirror obliquely oriented with respect to the axis of said light bundle and having a central aperture on said axis and a contact glass having a plano front surface and a concave surface adapted to be placed in contact with the eye to be treated.

2. Apparatus as defined in claim 1 wherein the contact glass includes at least one lateral mirror surface.

3. Apparatus as defined in claim 1 wherein the lens system includes a lens group positioned between the light source and the mirror.

4. Apparatus as defined in claim 3 wherein the lens system includes a second lens group positioned between the mirror and the contact glass, the rays of light between the two lens groups being parallel.

5. Apparatus as defined in claim 1 including a collecting lens between the mirror and the eye forming a virtual image in infinity of the retina to be treated.

6. Apparatus as defined in claim 1 including a telescope for viewing the retina to be treated through the central aperture of the mirror.

7. Apparatus as defined in claim 6 including an annular collecting lens positioned at a distance from the central aperture of the mirror greater than twice the product of the diameter of the aperture times the focal length of the collecting lens group divided by the diameter of the pupil of the eye to be treated.

8. Apparatus as defined in claim 3 including a tubular member between the said lens group and the mirror mounted for rotation about an axis normal to the axis of the light bundle to limit the cross-section of the light bundle to an elliptical lune.

9. Apparatus as defined in claim 1 including an optical element in the path of the light bundle mounted for rotation to engender a circular movement of the focus of the light bundle on the retina.

10. Apparatus as defined in claim 9 wherein the optical element is a wedge.

11. A method for the photocoagulation of small areas of the retina of the eye which comprises passing a light bundle focused on the retina to be treated through a contact glass having a plano front surface and a concave surface in contact with the eye to be treated.

12. A method as defined in claim 11 wherein the light bundle is a laser beam.

References Cited
UNITED STATES PATENTS

| | | | |
|---|---|---|---|
| 3,096,767 | 7/1963 | Gresser et al. | 128—395 |
| 3,315,680 | 4/1967 | Silbertrust et al. | 128—395 |

L. W. TRAPP, Primary Examiner

U.S. Cl. X.R.

128—395